(12) United States Patent
Johr et al.

(10) Patent No.: US 10,112,641 B2
(45) Date of Patent: Oct. 30, 2018

(54) GUIDE TUBE FOR A STEERING SHAFT AND METHOD FOR PRODUCING SAME

(71) Applicant: Adval Tech HOLDING AG, Niederwangen (CH)

(72) Inventors: Hans Johr, Kehrsatz (CH); Philipp Michel, Kirchlindach (CH)

(73) Assignee: Adval Tech Holding AG, Niederwangen (CH)

( * ) Notice: Subject to any disclaimer, the term of this patent is extended or adjusted under 35 U.S.C. 154(b) by 177 days.

(21) Appl. No.: 14/910,760

(22) PCT Filed: Aug. 4, 2014

(86) PCT No.: PCT/EP2014/066694
§ 371 (c)(1),
(2) Date: Feb. 8, 2016

(87) PCT Pub. No.: WO2015/018781
PCT Pub. Date: Feb. 12, 2015

(65) Prior Publication Data
US 2016/0185377 A1    Jun. 30, 2016

(30) Foreign Application Priority Data

Aug. 6, 2013 (CH) ....................................... 1358/13
Apr. 11, 2014 (CH) ....................................... 0561/14

(51) Int. Cl.
*B62D 1/185* (2006.01)
*B23P 15/00* (2006.01)
*B62D 1/16* (2006.01)

(52) U.S. Cl.
CPC .............. *B62D 1/185* (2013.01); *B23P 15/00* (2013.01); *B62D 1/16* (2013.01); *B23P 2700/50* (2013.01)

(58) Field of Classification Search
CPC . B62D 1/185; B62D 1/16; B23P 15/00; B23P 2700/50
See application file for complete search history.

(56) References Cited

U.S. PATENT DOCUMENTS 3,273,601 A * 9/1966 Gain .................... B21O 37/108
138/166
4,572,022 A * 2/1986 Mettler .................... B62D 1/16
188/67

(Continued)

FOREIGN PATENT DOCUMENTS

| EP | 0 502 761 A1 | 9/1992 |
| EP | 1 464 560 A2 | 10/2004 |
| WO | 01/94187 A1 | 12/2001 |

OTHER PUBLICATIONS

International Preliminary Report on Patentability issued from the International Bureau in counterpart International Application No. PCT/EP2014/066694, dated Feb. 9, 2016.

(Continued)

*Primary Examiner* — Joseph M Rocca
*Assistant Examiner* — Joselynn Y Sliteris
(74) *Attorney, Agent, or Firm* — Sughrue Mion, PLLC

(57) ABSTRACT

A guide tube (4) for the rotatable mounting of a steering spindle (2) of a motor vehicle is described, wherein the guide tube (4) is rolled cylindrically from a single sheet-metal section and is connected at an axial contact point (12), and wherein the guide tube (4) has elements (13-15) for the definably axially displaceable fastening in a bearing unit (1). The guide tube (4) is characterized in that the elements (13-15) are designed in the form of at least two beads (13) which are distributed over the circumference, run axially, are formed circumferentially on both sides by ribs (14, 15)

(Continued)

expanding the cylinder circumference and are formed in the sheet-metal section. A production method for such a guide tube (4) is also described.

29 Claims, 10 Drawing Sheets

(56) References Cited

U.S. PATENT DOCUMENTS

| | | | | |
|---|---|---|---|---|
| 5,239,888 | A | * 8/1993 | Sevault | B21O 37/15 280/779 |
| 6,149,526 | A | * 11/2000 | Boersma | B62D 1/185 403/225 |
| 6,601,427 | B2 | * 8/2003 | Kondou | B21O 37/104 72/368 |
| 2003/0209897 | A1 | 11/2003 | Manwaring et al. | |
| 2007/0163825 | A1 | * 7/2007 | Tokioka | B62D 1/185 180/78 |
| 2009/0203455 | A1 | * 8/2009 | Tokioka | B62D 1/16 464/167 |
| 2009/0205458 | A1 | 8/2009 | Clark et al. | |
| 2013/0160595 | A1 | 6/2013 | Moriyama et al. | |
| 2014/0346761 | A1 | * 11/2014 | Schnitzer | B62D 1/16 280/779 |
| 2014/0349772 | A1 | * 11/2014 | Daenzer | F16D 3/065 464/167 |
| 2015/0000456 | A1 | * 1/2015 | Schnitzer | B62D 1/16 74/493 |
| 2017/0356487 | A1 | * 12/2017 | Muntener | F16C 3/035 |

OTHER PUBLICATIONS

International Search Report for PCT/EP2014/066694 dated Oct. 27, 2014.

* cited by examiner

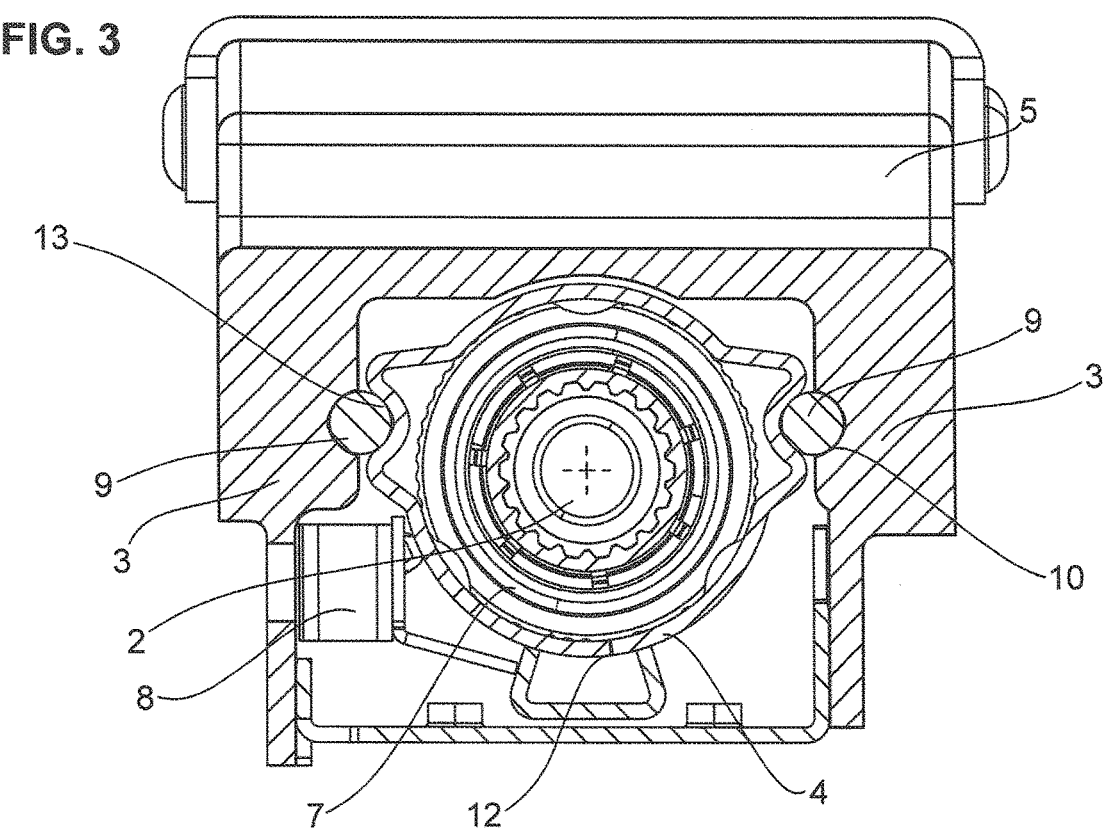
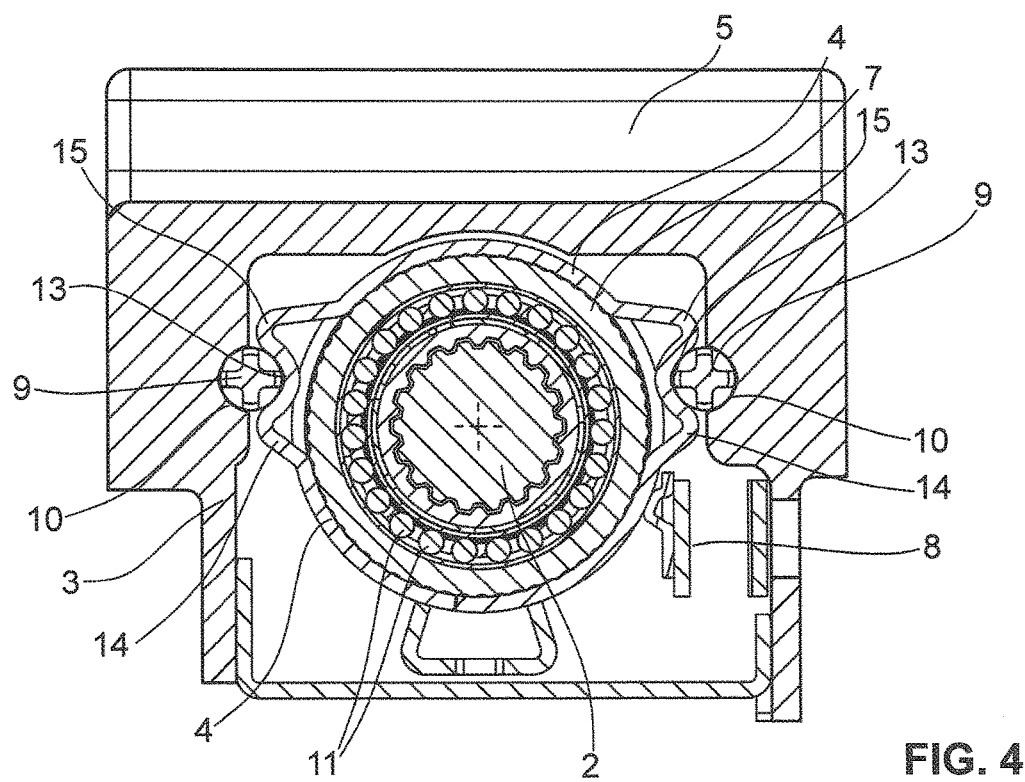

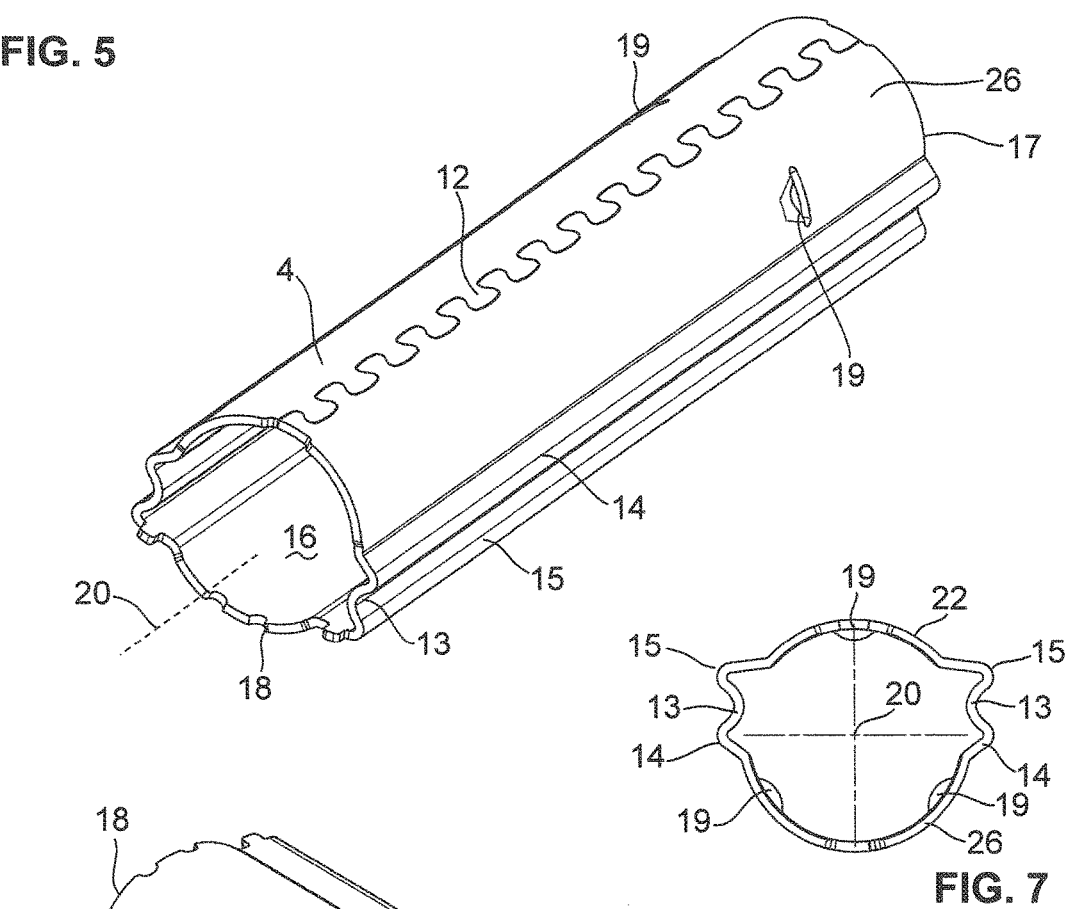
FIG. 5
FIG. 7
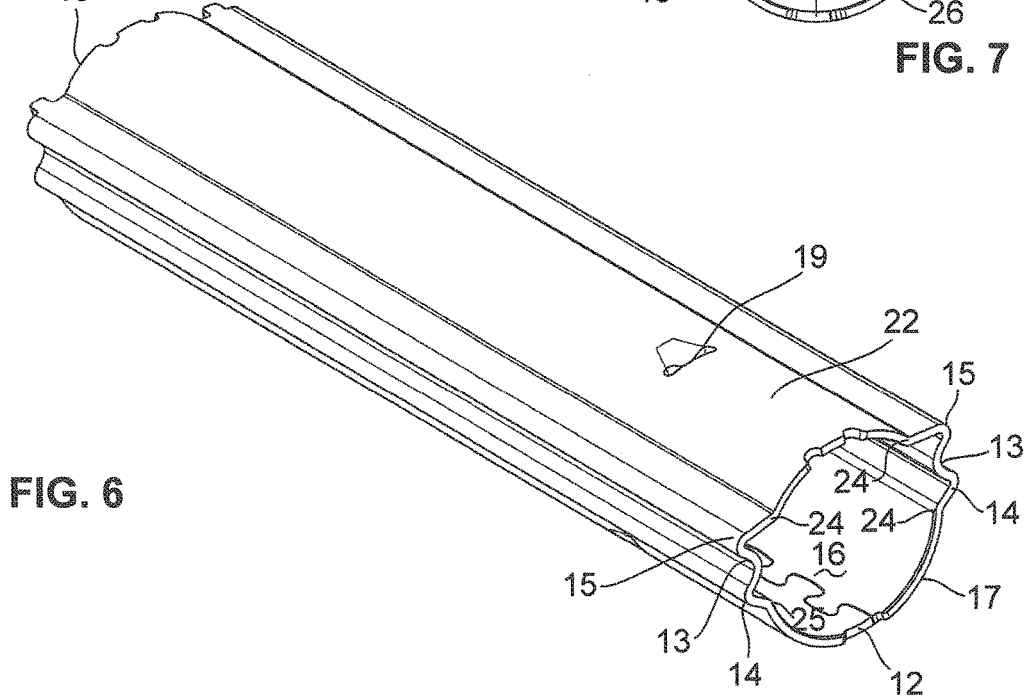
FIG. 6

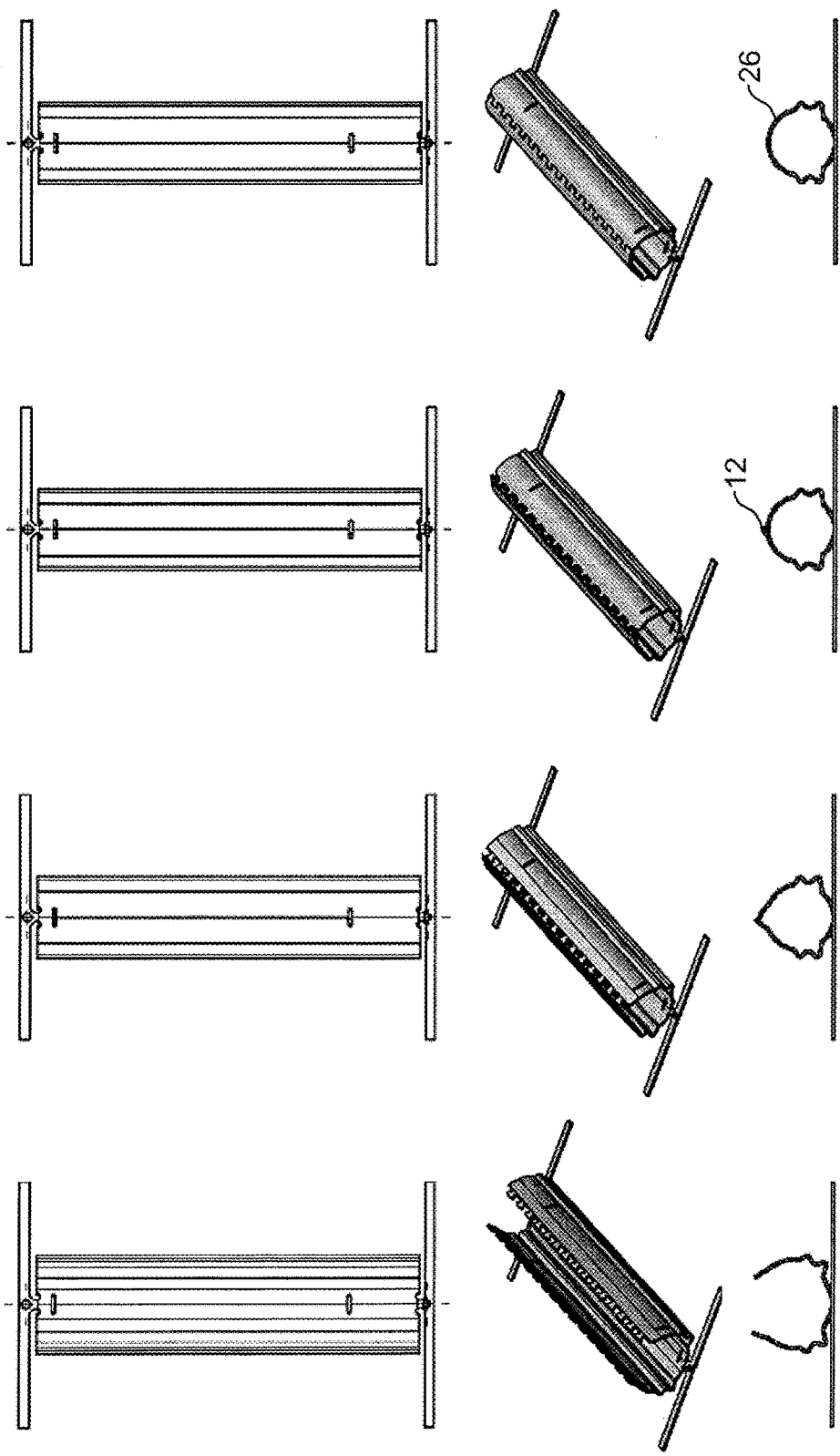

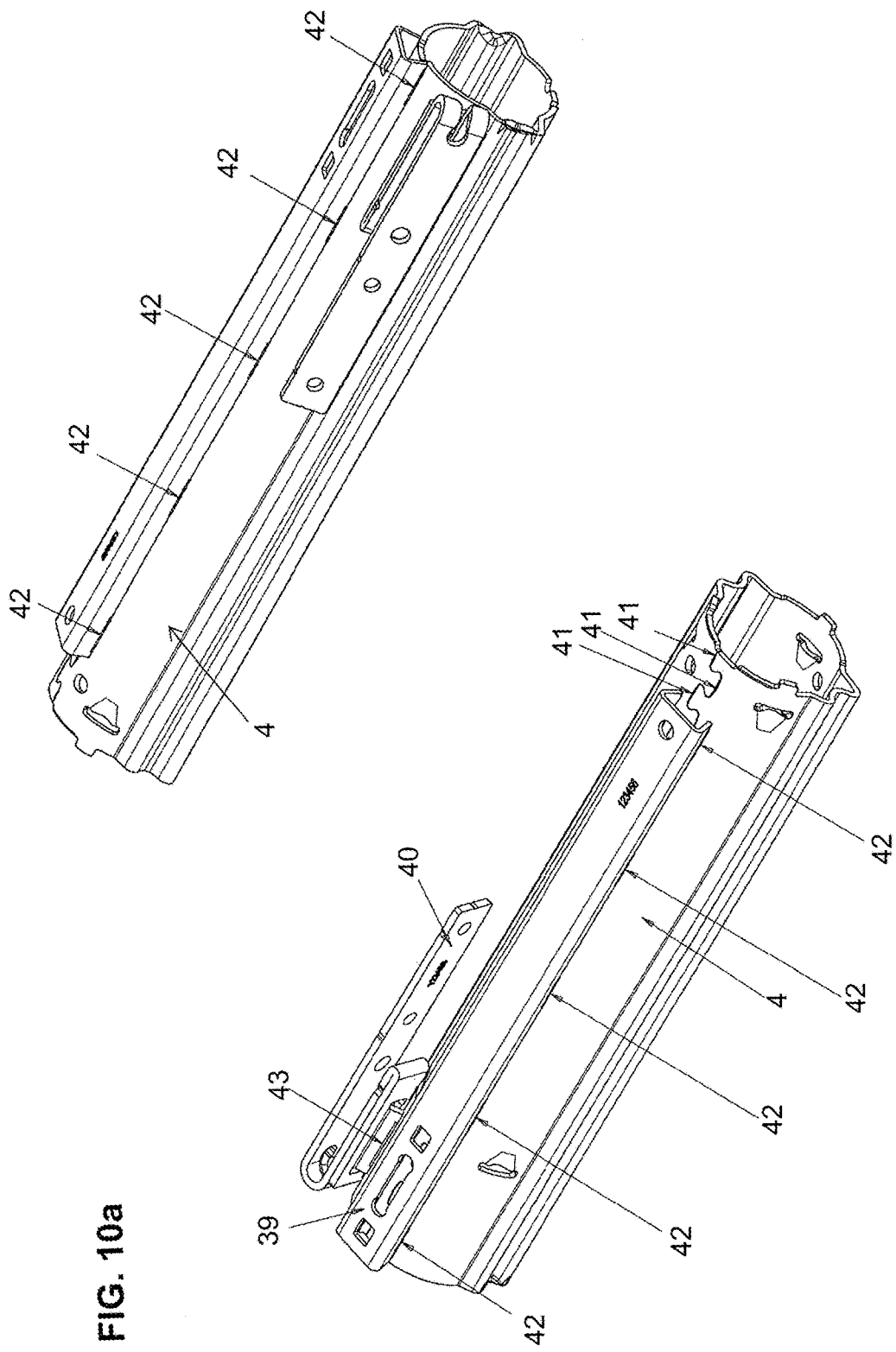

GUIDE TUBE FOR A STEERING SHAFT AND METHOD FOR PRODUCING SAME

CROSS REFERENCE TO RELATED APPLICATIONS

This application is a National Stage of International Application No. PCT/EP2014/066694 filed Aug. 4, 2014, claiming priority based on Swiss Patent Application Nos. 01358/13 filed Aug. 6, 2013 and 00561/14 filed Apr. 11, 2014, the contents of all of which are incorporated herein by reference in their entirety.

TECHNICAL FIELD

The present invention relates to a guide tube for a steering shaft for a motor vehicle, and to a particularly simple, quick, robust and favorable method for producing same.

PRIOR ART

The steering in a motor vehicle is generally constructed such that a steering spindle to which the steering wheel is fastened is rotatably mounted in a bearing unit. In order that the steering wheel is adjustable in terms of its height, the bearing unit can be fastened to the chassis in such a way that the steering spindle can he fixed. in different positions. In this case, there is generally a guide tube which receives the outer bearing bushings of the bearing for the steering spindle.

Such a guide tube is generally designed as a cylindrical tube, as is known generically in particular, for instance, from EP 0 502 761.

Such a guide tube can be mounted in the bearing unit in an also axially movable manner, so that the steering spindle can to some extent be altered in terms of its length detectable to the user, wherein the different axial positions can be fixed by a force closure and/or form closure, usually with a lever or an electric motor.

To this end, to such a guide tube according to the prior art (compare, for instance, the generic type according to EP 1 464 560) are welded, on the outer side, separate rail-shaped mounting elements, which enable the guide tube to be fixed in an axially displaceable manner in the bearing unit in different positions.

The production methods of such guide tubes comprise several steps and, apart from processes for stamping and forming a plurality of parts, they have the drawback that in joining processes the various components have to be joined together, for instance in a welding process.

REPRESENTATION OF THE INVENTION

Accordingly, the object of the invention is, inter alia, to provide an easily and precisely producible light guide tube for a steering shaft in a motor vehicle, which guide tube, moreover, can be cost-effectively produced.

The object of this invention is achieved by a guide tube and a method for producing same, as defined in the claims.

A fundamental core of the invention here consists in wholly dispensing with the separate mounting elements on the outer side of a cylindrical tube, as were provided according to the prior art, and in ensuring the interfaces for the axially displaceable mounting of the guide tube directly by an appropriate design of the wall of the tube per se with at least 2 guide grooves, distributed over the circumference. Thus, from a single stamped sheet metal part in a pure forming process, such a guide tube, inclusive of interface for the axially displaceable mounting, can be provided, in that this guide tube is not only rolled and connected and/or welded at the contact point, but that, at the same time, axial beads are configured from the sheet metal material.

Specifically, the present invention relates to a guide tube for the rotatable mounting of a steering spindle of a motor vehicle, wherein the guide tube is rolled cylindrically from a single metal sheet portion and is connected at an axial contact point, and wherein the guide tube has elements for the definably axially displaceable fastening in a bearing unit. According to the invention, such a guide tube is characterized, in particular, in that the elements are configured in the form of at least two beads, which are distributed over the circumference, are axially running, and are configured circumferentially on both sides by ribs that broaden the cylinder circumference, which beads are shaped in the metal sheet portion. At least 4 balls, normally a whole ball cage, which ball cage is provided in a corresponding groove in the bearing unit, can then engage in these beads, so that a neat axial mounting is obtained.

According to a first preferred embodiment, such a guide tube is characterized in that precisely two beads are configured, and these are directed symmetrically at two opposite sides. This means that, as is represented, for instance, in FIG. 7, they are intended to be supported by two ball bearings disposed on opposite and parallel running walls in the interior of the bearing unit.

According to a further preferred embodiment, the two heads are disposed in the same half-space, in relation to a center axis of the guide tube. This means that, as is represented, for instance, in FIG. 7, they are disposed with their lowest point, in relation to the axis, at an angle of less than 180°.

The axial contact point is preferably disposed on a circumferential portion between the two beads, preferably on the longer circumferential portion. According to a further preferred embodiment, the beads extend not only over a portion, but over the entire axial length of the guide tube.

The beads can form an outer contour different from a circular form, so that therein running balls come to bear at two opposite defined points against flanks of the ribs. For instance, it is preferred if these points, in relation to the balls, are arranged at an angle of in the region of 60-100°. Such a guide tube is preferably produced from a metal, preferably from a steel, in particular preferably from a black steel. This preferably having a thickness in the region of 1.5-2.5 mm.

According to a further preferred embodiment, such a guide tube can additionally have clinches as stops for the outer bearing bushing of the steering spindle, wherein preferably at one end, in particular at both ends of the guide tube, at least two, preferably at least 3 clinches of this type are arranged distributed over the circumference.

A further preferred embodiment of such a guide tube is characterized in that the metal sheet portion is connected at the contact point by a welded joint and/or spot-welded joint and/or a dovetail joint.

In addition, the present invention relates to a method for producing a guide tube of this type. Such a method is in particular preferably characterized in that, starting from a stamped metal sheet portion, in a forming process the guide tube is rolled and, at the same time, the ribs and the beads are configured. According to a first preferred embodiment of this method, the method is implemented in multiple stages and the individual circumferential portions are preferably formed sequentially, starting from a central axial center line, on both sides, wherein, in a last step, at the contact point, the guide tube is closed, preferably using exclusively forming operations and without any welding operations.

The method can have at least four, preferably at least eight stages, in particular between 8 and 12 stages. According to a further preferred embodiment of the proposed method, the stamped metal sheet portion has at at least one, preferably at both axial ends, handling portions, which in the region of the axial center line are connected to the sheet of the actual guide tube during the production method and are afterwards separated from the guide tube.

A further preferred embodiment of the proposed method aims to improve the roundness of the bearing seat in a beaded guide tube still further. To this end, a cylindrical mandrel, the external diameter of which substantially corresponds to the desired internal diameter of the guide tube, can be introduced in the region of the bearing seat into the interior of the guide tube, and the material can subsequently be specifically made to flow plastically in the circumferential direction of the mandrel with the aid of a tool which acts from outside. This is effected by an application of force to the guide beads with the aid of a specific tool comprising two dies. In first tests, by the use of this method, an improvement in the roundness tolerance from about 0.13 mm to about 0.06 mm was able to be achieved. It should be emphasized that this particular calibration method is a method which can be used not only in connection with a guide tube as has been described above, but generally with a rolled metal tube, preferably with a metal tube rolled from a single piece of metal. In the case of a guide tube as has been described. above, the tool, which acts from outside, engages in the concave transition region from both sides in order to bring about the displacement. In a more general application of this type, for instance, a metal tube which has on only one side just a single axially running rib, in which case the tool engages in the concave transition region to this rib at the top or bottom, can be calibrated, or a metal tube in which a single rib of this type can be disposed on two to some extent opposite sides can be calibrated. Tubes which have more than one bead on each side, or tubes in which fundamentally other axial structures which enable application of force by the tool are provided, can also be worked. In general terms, with respect to this specific implementation of the method, in the following whenever a guide tube is mentioned, a rolled metal tube having an axially extending connection point should thus also generally be understood.

Correspondingly, the present invention, according to a further preferred embodiment, relates to a method as has been described above, which method is characterized in that, after the closure of the guide tube (or generally of a rolled metal tube), this, at least in one of the end regions intended to receive the bearing, is reworked in order to increase the roundness, by a cylindrical mandrel being introduced into the interior of the end region and being made with two dies to flow plastically in the circumferential direction of the mandrel. This is preferably realized such that the dies, preferably in one work step on both sides of the guide tube, by means of corresponding contact regions, displace the transition region from the lower area of curvature to the lower axial rib in the circumferential direction of the transition region from the upper area of curvature to the upper axial rib, through the application of force. Prior to this method step for increasing the roundness, the guide tube can possibly firstly be reworked, for example by the point-by-point or region-by-region rewelding of a created dovetail joint at the contact point and/or by the welding of further elements, such as, in particular, reinforcement profiles and/or crash elements, onto the guide tube. In order to limit this calibration to the axial portion, which must actually be brought to higher precision, it can be advantageous if the guide tube possesses a circumferential portion in the region of the beads or ribs, preferably on both sides, a slot, a so-called free stamping. This slot separates to some extent, in this circumferential region, the region to be worked (to be calibrated) from the region not to be worked. This has the result that the worked region is decoupled from the other, unworked region, and thus the stabilizing effect of the ribs in the unworked region has no influence on the worked region. The calibration can hence be performed in the worked region with yet greater precision.

According to a further preferred embodiment of this method, at least one of the contact regions, preferably both, has a circumferential contact region which follows the outer circumference of the guide tube over a limited circumferential portion and faces away from the respective rib.

Further embodiments are defined in the dependent claims.

BRIEF DESCRIPTION OF THE DRAWINGS

Preferred embodiments of the invention are described below on the basis of the drawings, which have merely an illustrative function and should not be interpreted as restrictive. In the drawings:

FIG. 3 shows a section according A-A, as indicated in FIG. 1, through such a bearing unit;

FIG. 4 shows a section according to B-B, as indicated in FIG. 1, through such a bearing unit;

FIG. 5 shows a guide tube in a perspective view from below;

FIG. 6 shows a guide tube in a perspective view from above;

FIG. 7 shows a section through such a guide tube;

FIG. 10 shows a guide tube in a perspective view from below, from one (a) and the other (b) side.

DESCRIPTION OF PREFERRED EMBODIMENTS

Figure 1:
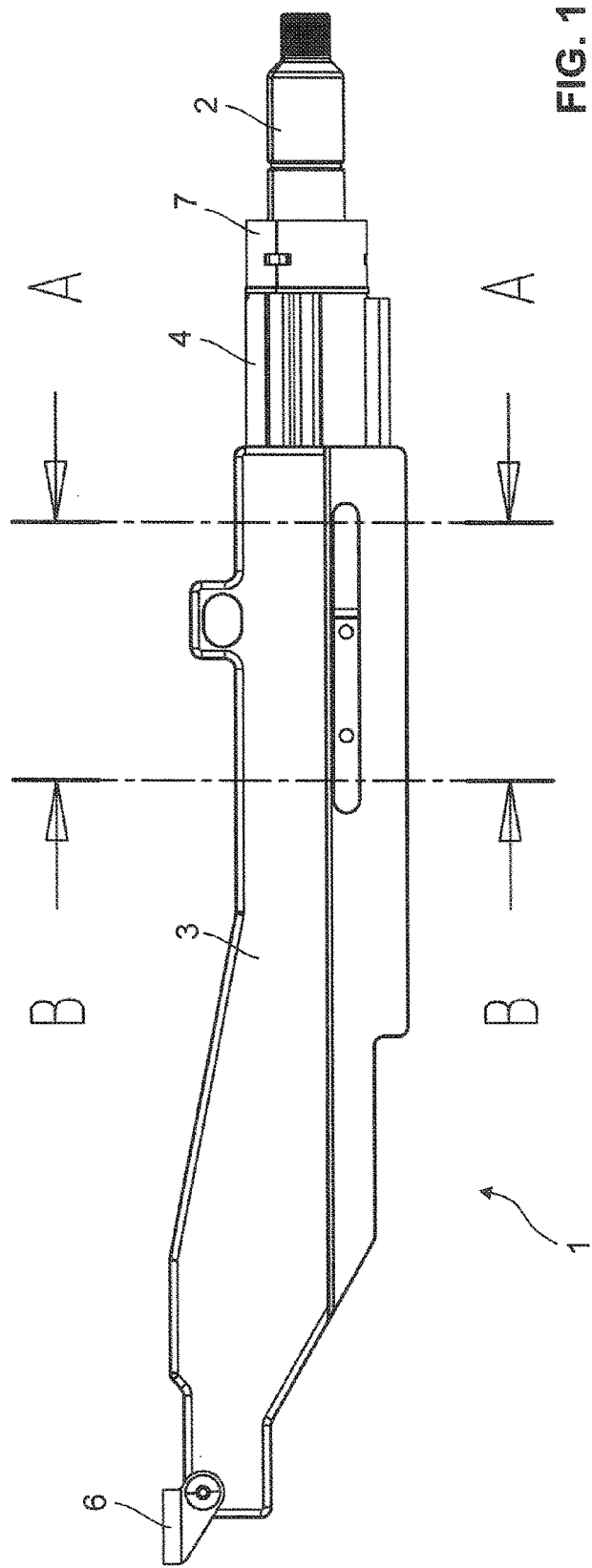
FIG. 1 shows an entire bearing unit in a side view.
Figure 2:
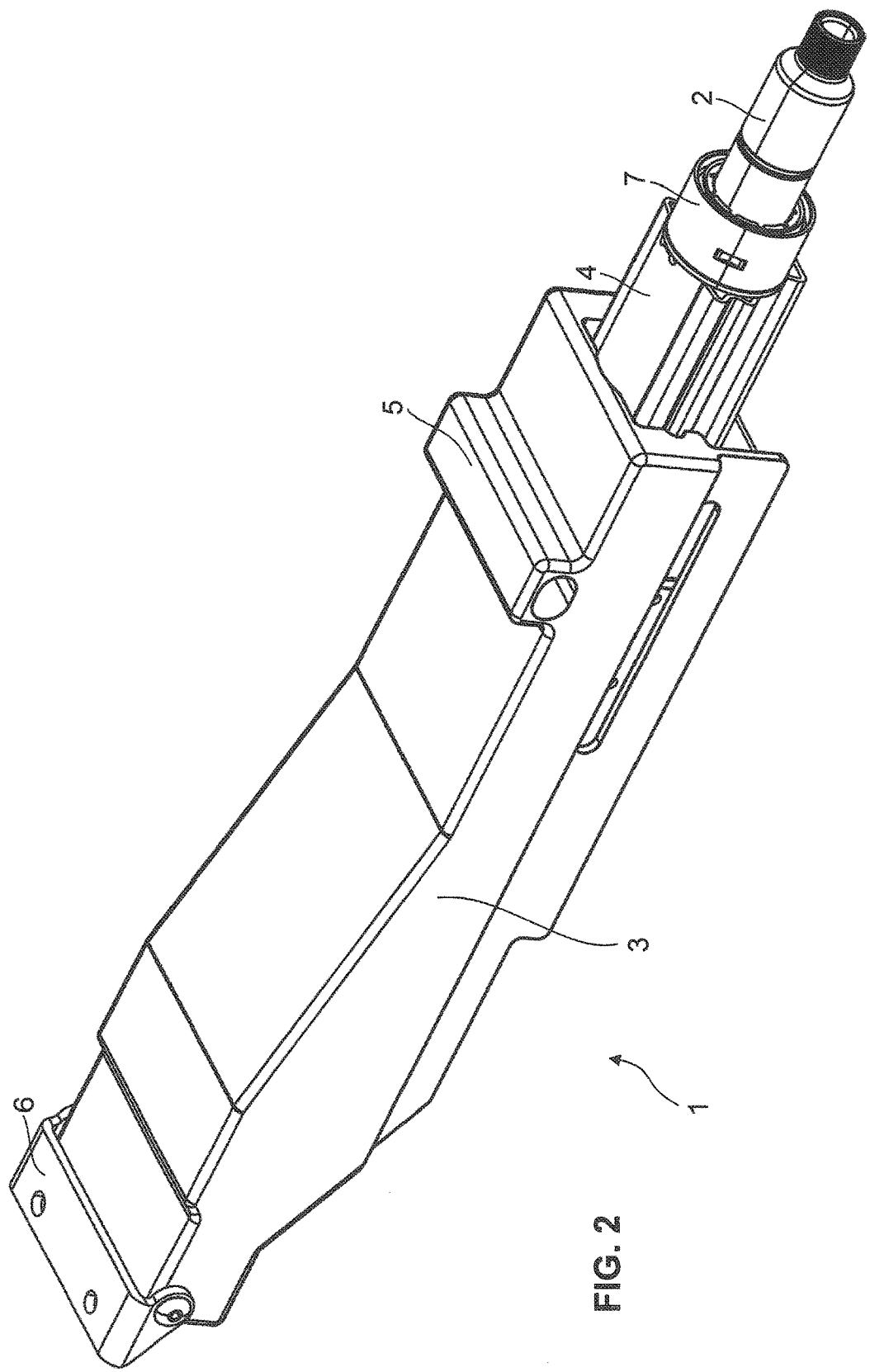
FIG. 2 shows the bearing unit according to FIG. 1 in a perspective view.
Figure 8D:
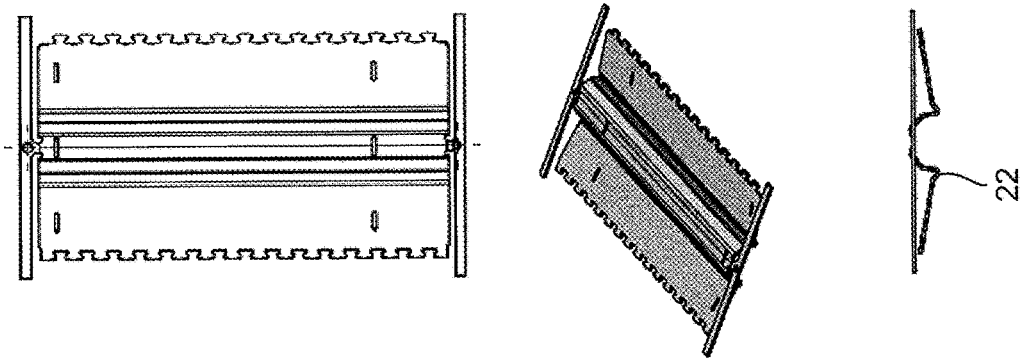
FIG. 8 shows in a)-1) the individual stages of the production method in the forming process after the stamping of the blank, wherein respectively at the top is represented a top view, in the middle a perspective view, and at the bottom a sectional representation in a plane perpendicular to the axis of the resulting guide tube.
Figure 8C:
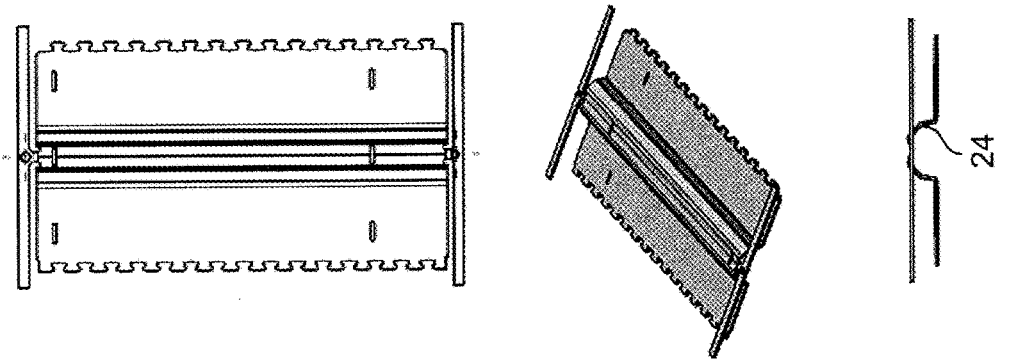
Figure 8B:
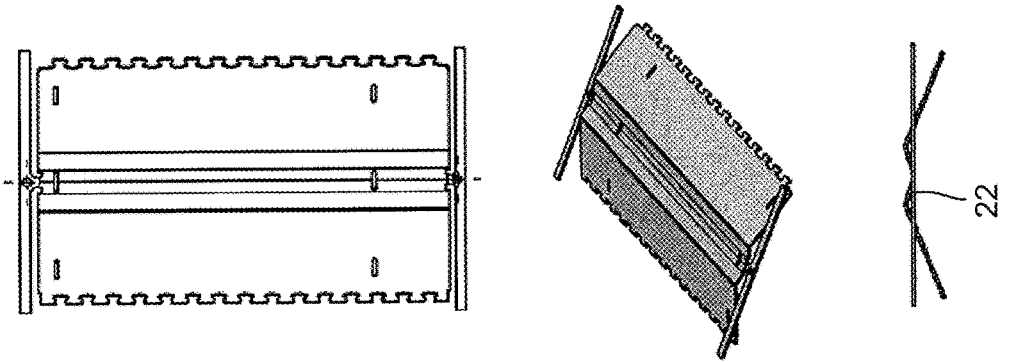
Figure 8A:
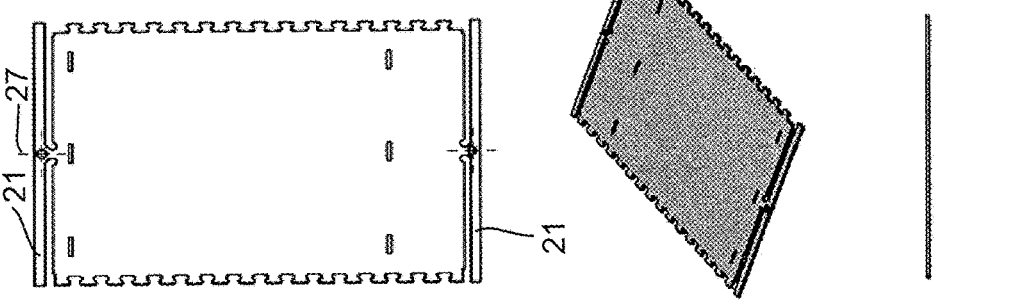
Figure 8H:
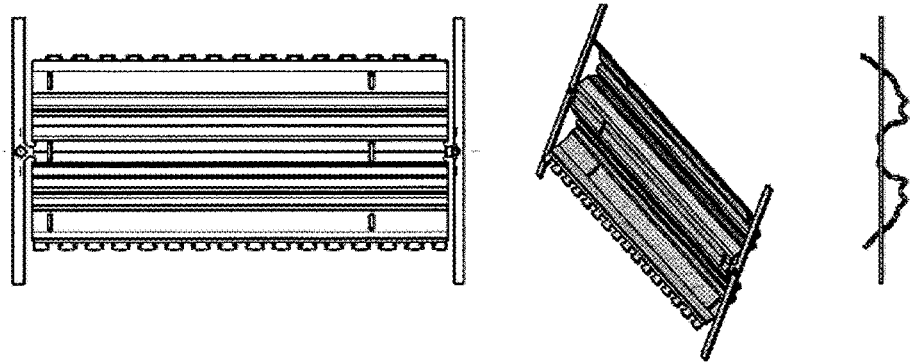
Figure 8G:
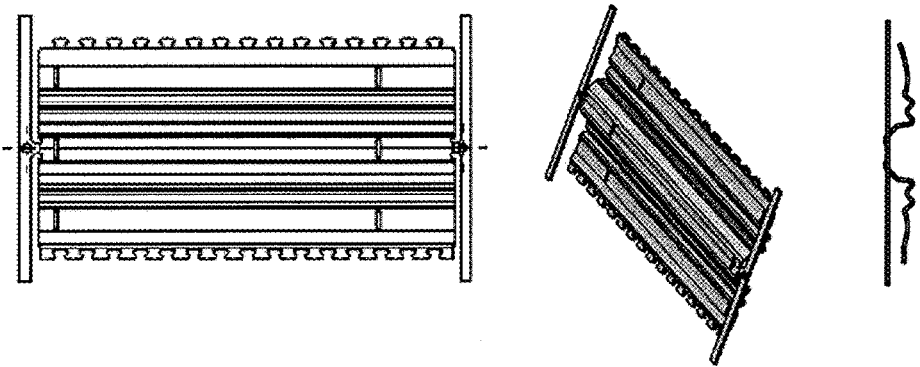
Figure 8F:
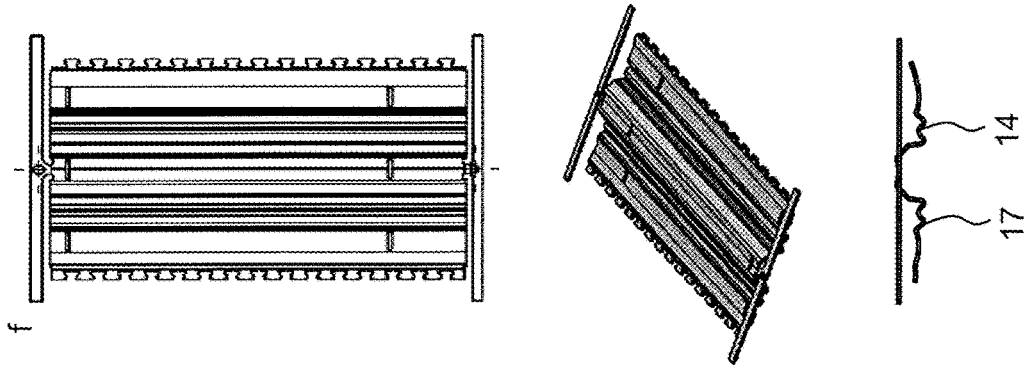
Figure 8E:
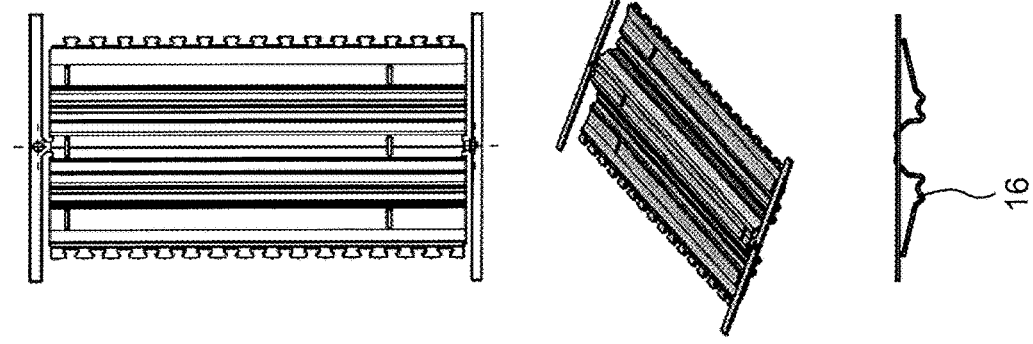
Figure 9A:
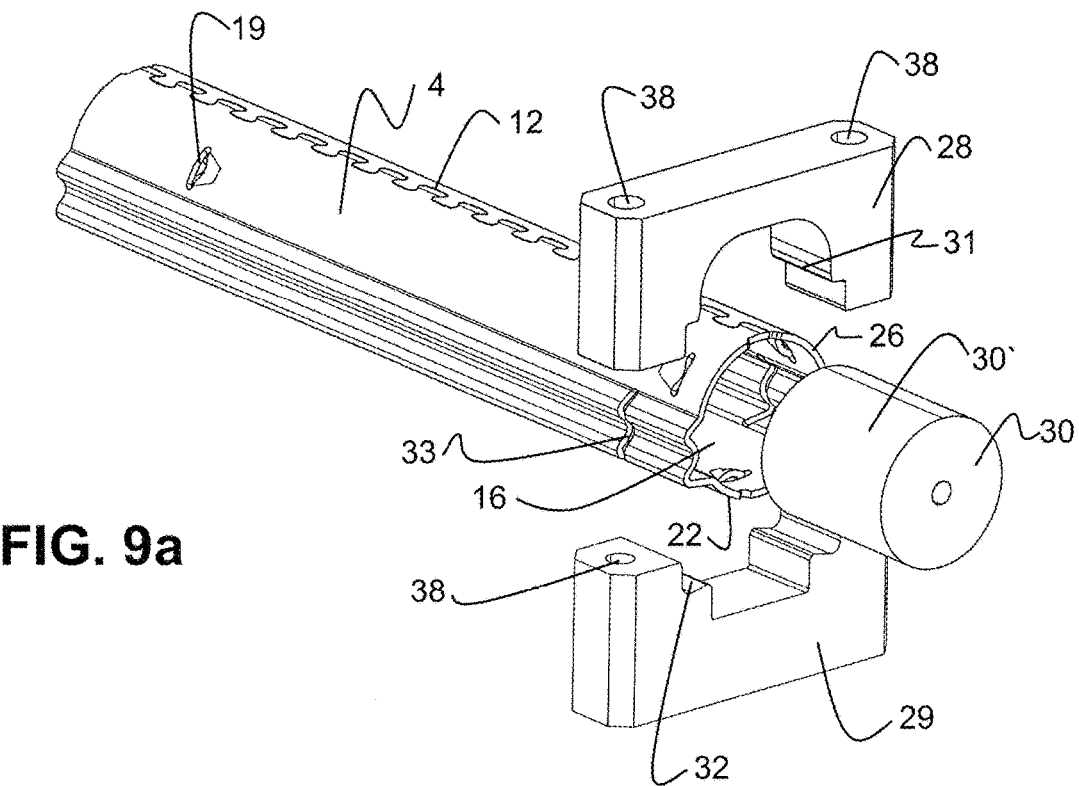
FIG. 9 shows various views of a device for reworking a guide tube (or generally a metal tube) in order to increase the roundness in a portion, in particular in the region of the bearing seat, wherein in a) the open tool is represented in a perspective view, in b) the closed tool is represented in a perspective view, respectively with guide tube, in c) a view of the tool in the axial direction in the open position without guide tube, in d) a view of the tool in the axial direction in the closed position with guide tube, and in e) the detailed view according to B in FIG. 9d.
Figure 9B:
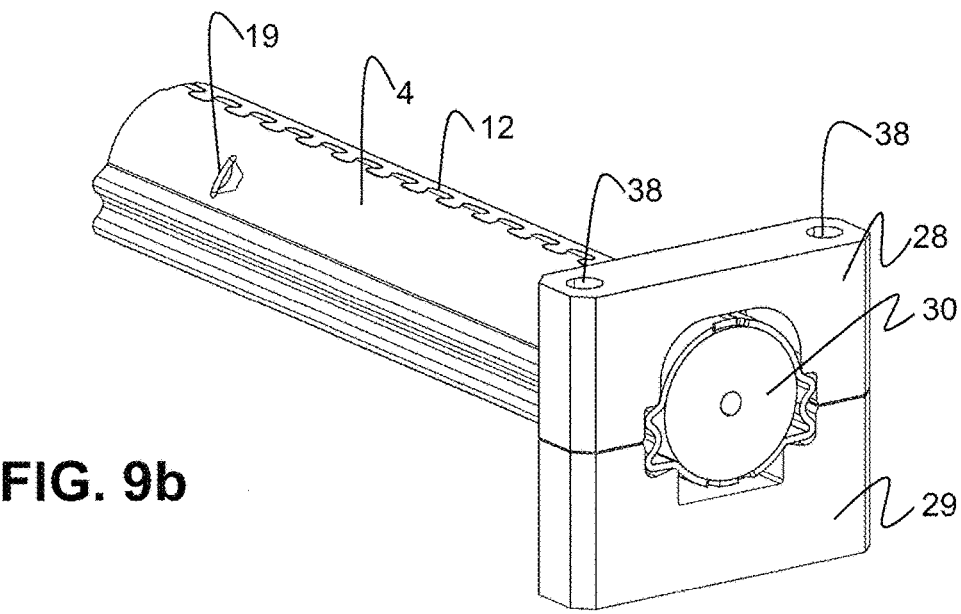
Figure 9C:
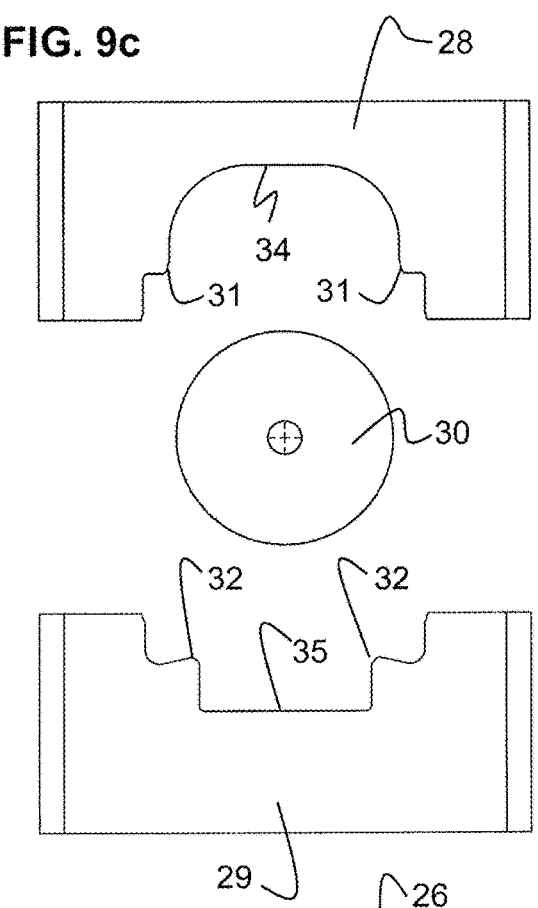
Figure 9D:
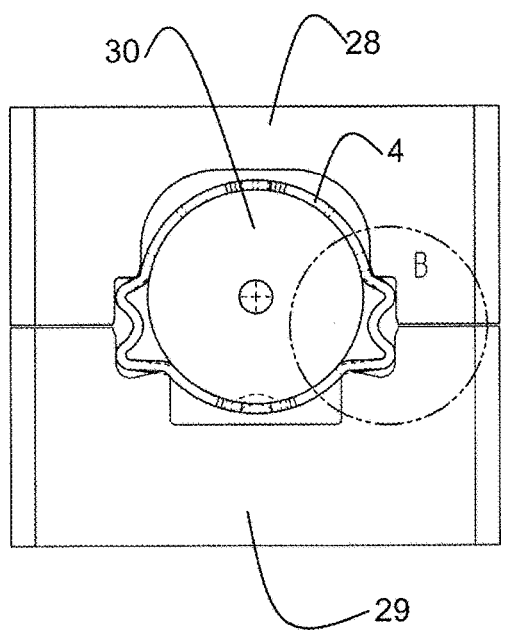
Figure 9E:
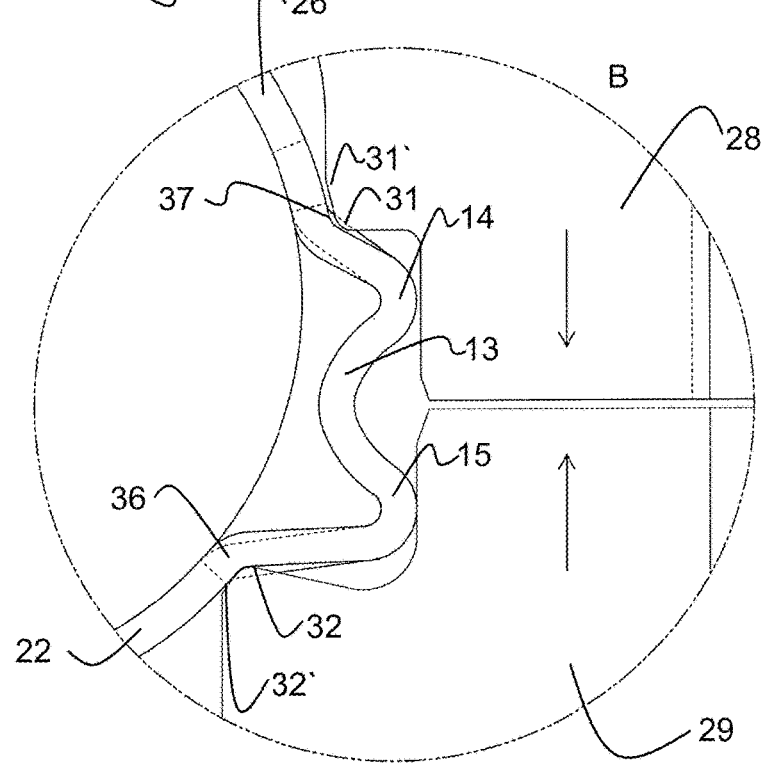

In FIGS. 1 to 4, an entire bearing unit 1 is represented with a guide tube 4 installed. In FIG. 1, a lateral view, it is in particular apparent how, on the upper front side, the steering spindle 2 protrudes from the bearing unit 1. As is revealed in particular from FIG. 4, the steering spindle 2 is mounted in a bearing, to be precise with an outer bearing bushing which is fastened in the guide tube 4. In concrete terms, the bearing, with the bearing hushing 7 and the balls 11, is pressed into the guide tube. There is a corresponding bearing also at the other end of the guide tube, though this is not apparent in FIGS. 1 to 3, but very clearly apparent in FIG. 4, where it is represented in section directly through the balls. On the actual bearing unit 1 there are fastening elements 5 for functional components, as well as, in particular, a fastening element 6, arranged over a pivot bearing, for the direct or indirect fastening to the cross member of the chassis. The box-shaped outer casing 3 is here generally a die casting (cf. in particular FIG. 2), which provides an axially running cavity for the reception of the guide tube 4. As can be seen from FIG. 3, in this box-shaped outer casing, in the interior, there are two opposite channel-shaped depressions 10, which are axially running and respectively receive opposite ball bearing cages containing the balls 9. These balls 9 are thus trapped in the depressions 10 on one side and on the other side by axially running beads 13, which are shaped in the sheet of the guide tube 4, likewise running over the entire length. Thus the guide tube 4 is mounted in an axially displaceable manner in the box 3 by means of the ball bearing 9. This in a manner which is definable given a specific desired setting, i.e. there is additionally a mechanism which allows the guide tube, following displacement to the correct axial position, to be fixed in this, for example via a force closure or a form closure, or a combination thereof. For this purpose, there is here a connecting element 8, which, when actuated by means of a lever or a motor, fixes the axial position by force closure.

Alternatively it is possible to here replace a force closure by a rod gear or a similar solution, which is actuated by means of, for example, an electric motor or a crank.

As can be seen from FIG. 4, the guide tube possesses two lateral beads 13 of this type, which are facing toward the parallelly arranged and opposite walls of the interior of the box 3. The actual beads 13 are formed by two axially running ribs, by respectively a lower rib 14 and an upper rib 15. The two beads 13 are both disposed above an equatorial plane (in the upper half-space according to the sectional representation in FIG. 7), so that then, owing to the mutual alignment laterally outward, the upper rib 15 projects substantially further from the circumference of the guide tube.

In FIGS. 5 to 7, the guide tube is represented in a perspective view from below (FIG. 5) and from above (FIG. 6), and in an axial section (7). Here it is apparent that the guide tube is produced from a single metal sheet portion, which is connected on the bottom side by a dovetail joint closure, possibly supported by a welding or spot welding. The dovetail joint 12 is thus disposed in the lower area of curvature 26. i.e. in the long area of curvature. The short area of curvature 22 forms the top side. The upper area of curvature 22 and the lower area of curvature 26 are disposed on the same circular-cylindrical surface and form the actual cylindrical hollow body, which encloses the interior 16 of the guide tube and defines the longitudinal axis 20.

Starting from the kinks 24 and 25, from this cylindrical basic structure are shaped the two lateral beads 13, which are formed by the ribs 14 and 15. Moreover the guide tube possesses clinches 19, which serve as stops for the outer bearing bushing 7 both on the front side 17 and on the rear side 18 (not represented in FIGS. 5 to 7, but represented in FIG. 8).

In FIG. 8 is represented a production method for such a guide tube. Starting from a stamped metal sheet portion as represented in FIG. 8a, where already on the lateral edges the contour for the dovetail joint is preformed and, in addition, at the two ends handling strips 21 are provided, which handling strips are not further worked in the forming process, but serve to secure the component during the forming processes, i.e. are connected only in the region of the center line 27 to the sheet forming the final guide tube.

In a first forming step, a first part of the upper area of curvature 22 is now formed. After this first stage in figure b), in a next step the kink 24 is configured for the transition to the upper rib 15, as is then represented in figure c). In a following step, the crest of the rib 15 is formed and the lateral metal sheet portions are shifted back upward, as is represented in the end result in figure d). In the next steps e)-g), the individual ribs are configured, wherein this can possibly also be effected in one or just in two stages. Here, three stages are represented: in a first stage the inner rib is completed, which then forms the upper rib 15; in a second step, the outermost rib 14, which will then form the lower rib; and in the last step, the result of which is represented in figure g), the configuration of these two ribs is then once again calibrated and adjusted relative to each other.

In the following step, the result of which is represented in figure h), a first region of the lower area of curvature is now configured; in the following steps, the results of which are represented in i) and j), this region is substantially closed, so as then to be fully closed in the concluding steps k) and l) in such a way, that then the dovetail joint 12 too is closed and the lower area of curvature 26 is of completely cylindrical configuration. Here the final operation, comprising the removal, of the handling strips 21, is no longer represented.

Such a method allows a guide tube in which elements are provided for the axially displaceable, yet fixable mounting in a box made of the material of the tube and in one piece therewith. The method is simple, quick, cost-effective and very robust and accordingly allows a very efficient production of such a bearing box with high rigidity and low weight.

As a result of the multistage rolling operation, a guide tube which is produced according to the above-described method has superb precision over the entire length. In order to ensure in the region of the bearing seat, that is to say at at least one end of the tube, a still more precise roundness, it can be advantageous, in a further downstream step, to calibrate the region of the bearing seat. This method, with which, in particular, the roundness in this end region can be improved, shall be explained on the basis of the representations in FIG. 9.

For the calibration a tool is provided, which tool has a cylindrical central mandrel 30, which is intended to be inserted into the end portion of the interior 16 of the guide tube 4 during the working of one or both sides, depending on whether one or both ends are due to be reworked. The cylindrical outer surface 30' of this mandrel 30 here substantially corresponds to the desired internal diameter of the two areas of curvature 22 and 26 of the guide tube.

In addition, the tool comprises a lower die 28 and an upper die 29, which have guide elements 38 in the form of guide openings, so that they can be guided directly coupled to one another. Alternatively it is also possible, however, to mount the two tools in a column mount, so that they are not guided directly coupled to one another. The dies 28 and 29 respectively possess a cutout, which embraces the guide tube and which respectively on opposite sides has a contact region 31, 32. In the intervening regions 34 and 35, the cutouts do not come into contact with the guide tube 4 in the course of the working. In other words, the contact regions 31 and 32 are to some extent only regionally and quite specifically at the critical places in contact with the guide tube 4, each tool possessing two symmetrically arranged contact regions.

The contact regions 31 and 32 are here configured as protrusions extending axially along the outer contour of the guide tube, which protrusions respectively engage in the concave kink between the lower area of curvature 26 and the lower axial rib 14 and in the transition region between the upper area of curvature 22 and the upper axial rib 15. As can be discerned, in particular, on the basis of the detailed drawing according to FIG. 9e, the moving closer together of the two dies 28/29 according to the arrows represented in FIG. 9e results in the contact regions 31 and 32 engaging to some extent in the respective concave transition region 37 and 36, respectively, and there displacing the material in the circumferential direction and thus making it flow, and in this way moving the regions 37/36 closer together in the circumferential direction. The material of the guide tube is thus formed out of the original position shown in dashed representation in FIG. 9e and displaced relative to the solid line, and since in this operation a more extensive forming around the whole of the circumference is effected as a consequence of the plastic flowing, the roundness is in this way substantially improved around the whole of the circumference.

In order to be able to effectively control the process, it can be advantageous if the contact regions have respectively in the region facing away from the ribs a circumferential contact region 31' and 32', which there substantially follow the circumference on the outer side of the guide tube.

Typically, if the effective displacement in a guide tube having a diameter of 45 mm moves in the region of no more than 1.5 mm, typically in the region of 0.5-1.0 mm, the relative displacement of the two dies one toward the other along the arrows represented in the figure is viewed in the phase involving contact between the tool and the worked workpiece.

Ultimately, as a result of this downstream calibration method, the roundness tolerance can be reduced from typically about 0.13 mm to about 0.06 mm.

The roundness tolerance can further be increased by the provision of a free stamping 33 represented in the figures, i.e. to some extent a slot which separates the worked region from the unworked region of the tube, in particular in the region of the ribs and only in this region. As a result, the calibration region is decoupled from the rest of the tube and the calibration becomes more accurate because the beads in the region of the unworked tube cannot have a stabilizing effect. That method for improving the roundness in the end regions of the guide tube which is set out above in connection with FIG. 9 can be realized either, as represented in FIG. 9, on the fundamentally not yet further processed guide tube 4. It is also possible, however, to apply the method for improving the roundness to a not yet further processed unit, i.e. to the sub-assembly. Thus it is possible, for instance, that the guide tube 4, after it has to some extent, after having passed through the steps represented in FIG. 8, been brought into the state according to FIGS. 5-7, is further worked before the method for calibrating the end regions is implemented. This in particular by, as is represented in FIG. 10, prior to the implementation of the method for improving the roundness, the dovetail joint being reinforced by additional welds, denoted in FIG. 10 by the reference symbol 41. The corresponding welded joints 41 are preferably located on the respectively axially running portions of the joint, are represented in FIG. 10 as axially extending joints, but can also be spot-welded joints. Furthermore, additional elements can be fastened to the guide tube. Represented concretely in FIG. 10 is a reinforcement profile 39, which with welds 42 spread out in the axial direction is fastened to the guide tube such that it bridges the dovetail joint. In addition, a further element, such as, for instance, the crash element 40 represented in FIG. 10, can be fastened, once again by means of appropriate welds 43. It is evident that from a reworking of this type to a sub-assembly according to FIG. 10, in particular if welding operations are passed through, certain dimensional distortions can possibly result. If, in other words, the improvement of the roundness is realized prior to these working steps, the additional benefit, achieved by this method, of better precision of the position support points can possibly be destroyed again. Correspondingly, the approach can preferably be adopted that firstly these further working steps (welding of the dovetail joint and welding-on of further elements) are performed, and only then does that method for improving the roundness in the end regions which is represented in FIG. 9 and is described above come to be implemented. In general terms, it can be said that the method for improving the roundness in the end regions is preferably applied as shortly as possible before (i.e. for example as the last processing step before) the effective introduction of the bearings into the improved end regions of the bearing box.

REFERENCE SYMBOL LIST 1 bearing unit
2 steering spindle
3 box-shaped outer casing of 1
4 guide tube
5 fastening element for functional components
6 fastening element for pivotable direct or indirect fastening to the chassis
7 outer bearing bushing of steering spindle
8 connecting element for non-positive axial fixing of the position of 4 in 3
9 ball bearings
10 depressions in 3 for 9
11 balls of steering spindle mounting
12 zip fastening of guide tube
13 beads in the guide tube
14 lower axial rib
15 upper axial rib
16 interior of guide tube
17 front end of guide tube
18 rear end of guide tube
19 clinch as bearing stop
20 longitudinal axis of guide tube
21 handling strips
22 upper area of curvature of the guide tube
24, 25 kink in transition to 14/15
26 lower area of curvature of the guide tube
27 center line
28 lower die
29 upper die
30 cylindrical mandrel
30' cylindrical outer surface of 30
31 contact region of 28
31' circumferential contact region of 28
32 contact region of 29
32' circumferential contact region of 29
33 free stamping, incision in circumferential direction in the bead region
34 contactless region at 26
35 contactless region at 22
36 transition region from 22 to 15
37 transition region from 26 to 14
38 guide openings
39 reinforcement profile
40 crash element
41 weld on dovetail joint 42 weld on reinforcement profile
43 weld on the crash element

The invention claimed is:

1. A guide tube for the rotatable mounting of a steering spindle of a motor vehicle,
wherein the guide tube is rolled cylindrically from a single metal sheet portion and is connected at an axial contact point, and
wherein the guide tube has elements for the definably axially displaceable fastening in a bearing unit,
wherein the elements are configured in the form of at least two beads, which are distributed over the circumference, are axially running, and are formed circumferentially on both sides by ribs that broaden the cylinder circumference, which beads are shaped in the metal sheet portion.

2. The guide tube as claimed in claim 1, wherein precisely two beads are configured, and these are directed symmetrically at two opposite sides.

3. The guide tube as claimed in claim 2, wherein the two beads are disposed in the same half-space, in relation to a center axis of the guide tube.

4. The guide tube as claimed in claim 2, wherein the axial contact point is disposed on a circumferential portion between the two beads.

5. The guide tube as claimed in claim 2, wherein the axial contact point is disposed on the longer circumferential portion between the two beads.

6. The guide tube as claimed in claim 1, wherein the beads extend over the entire axial length of the guide tube.

7. The guide tube as claimed in claim 1, wherein the beads form an outer contour different from a circular form, so that therein running balls come to bear at two opposite defined points against flanks of the ribs.

8. The guide tube as claimed in claim 1, wherein it consists of a metal.

9. The guide tube as claimed in claim 1, wherein clinches are additionally provided as stops for the outer bearing bushing of the steering spindle.

10. The guide tube as claimed in claim 1, wherein the metal sheet portion is connected at the contact point by at least one of a welded joint, spot-welded joint, or a dovetail joint.

11. A method for producing a guide tube as claimed in claim 1, wherein, starting from a stamped metal sheet portion, in a forming process the guide tube is rolled and, at the same time, the ribs and the beads are configured.

12. The method as claimed in claim 11, wherein the method is implemented in multiple stages and the individual circumferential portions are formed sequentially, starting from a central axial center line, on both sides, and in a last step, at the contact point, the guide tube is closed.

13. The method as claimed in claim 11, wherein after the closure of the guide tube, possibly after reworking, or after welding of further elements onto the guide tube, this, at least in one of the end regions intended to receive the bearing, is reworked in order to increase the roundness, by a cylindrical mandrel being introduced into the interior of the end region and being made with two dies to flow plastically in the circumferential direction of the mandrel, by means of corresponding contact regions, displacing the transition region from the lower area of curvature to the lower axial rib in the circumferential direction of the transition region from the upper area of curvature to the upper axial rib, through the application of force.

14. The method as claimed in claim 13, wherein at least one of the contact regions has a circumferential contact region which follows the outer circumference of the guide tube over a limited circumferential portion and faces away from the respective rib.

15. The method as claimed in claim 13, wherein both contact regions have a circumferential contact region which follows the outer circumference of the guide tube over a limited circumferential portion and faces away from the respective rib.

16. The method as claimed in claim 11, wherein after the closure of the guide tube, after at least one of welding of a created dovetail joint at the contact point or after welding of further elements onto the guide tube, this, at least in one of the end regions intended to receive the bearing, is reworked in order to increase the roundness, by a cylindrical mandrel being introduced into the interior of the end region and being made with two dies to flow plastically in the circumferential direction of the mandrel, by the dies by means of corresponding contact regions, displacing the transition region from the lower area of curvature to the lower axial rib in the circumferential direction of the transition region from the upper area of curvature to the upper axial rib, through the application of force.

17. The method as claimed in claim 11, wherein after the closure of the guide tube, after at least one of welding of a created dovetail joint at the contact point or after welding of further elements, in the form of reinforcement profiles or crash elements, onto the guide tube, this, at least in one of the end regions intended to receive the bearing, is reworked in order to increase the roundness, by a cylindrical mandrel being introduced into the interior of the end region and being made with two dies to flow plastically in the circumferential direction of the mandrel, by the dies, in one work step on both sides of the guide tube, by means of corresponding contact regions, displacing the transition region from the lower area of curvature to the lower axial rib in the circumferential direction of the transition region from the upper area of curvature to the upper axial rib, through the application of force.

18. The method as claimed in claim 11, wherein after the closure of the guide tube, this, at least in one of the end regions intended to receive the bearing, is reworked in order to increase the roundness, by a cylindrical mandrel being introduced into the interior of the end region and being made with two dies to flow plastically in the circumferential direction of the mandrel, by the dies.

19. The method as claimed in claim 11, wherein after the closure of the guide tube, this, at least in one of the end regions intended to receive the bearing, is reworked in order to increase the roundness, by a cylindrical mandrel being introduced into the interior of the end region and being made with two dies to flow plastically in the circumferential direction of the mandrel, by the dies, in one work step on both sides of the guide tube, by means of corresponding contact regions, displacing the transition region from the lower area of curvature to the lower axial rib in the circumferential direction of the transition region from the upper area of curvature to the upper axial rib, through the application of force.

20. The method as claimed in claim 11, wherein the method has at least four.

21. The method as claimed in claim 11, wherein the stamped metal sheet portion has at at least one, axial end handling portions, which in the region of the axial center line are connected to the sheet of the actual guide tube during the production method and are afterwards separated from the guide tube.

22. The method as claimed in claim 11, wherein the method is implemented in multiple stages and the individual circumferential portions are formed sequentially, starting from a central axial center line, on both sides, and in a last step, at the contact point, the guide tube is closed, using exclusively forming operations and without any welding operations.

23. The method as claimed in claim 11, wherein the method has at least eight stages.

24. The method as claimed in claim 11, wherein the method has between 8 and 12 stages.

25. The method as claimed in claim 11, wherein the stamped metal sheet portion has at both axial ends handling portions, which in the region of the axial center line are connected to the sheet of the actual guide tube during the production method and are afterwards separated from the guide tube.

26. The guide tube as claimed in claim 1, wherein it consists of a steel.

27. The guide tube as claimed in claim 1, wherein it consists of a black steel.

28. The guide tube as claimed in claim 1, wherein it consists of a steel having a thickness in the region of 1.5-2.5 mm.

29. The guide tube as claimed in claim 1, wherein clinches are additionally provided as stops for the outer bearing bushing of the steering spindle, wherein at both ends of the guide tube, at least two, or at least 3 clinches of this type are arranged distributed over the circumference.

* * * * *